United States Patent
Rizea et al.

(10) Patent No.: US 10,083,018 B1
(45) Date of Patent: Sep. 25, 2018

(54) SYSTEMS AND METHODS FOR DISTRIBUTING APPLICATION TEMPLATES TO WEARABLE CLIENT DEVICES

(71) Applicant: Fitbit, Inc., San Francisco, CA (US)

(72) Inventors: Daniel O. Rizea, Bucharest (RO); Andrei Pitis, Bucharest (RO)

(73) Assignee: Fitbit, Inc., San Francisco, CA (US)

( * ) Notice: Subject to any disclaimer, the term of this patent is extended or adjusted under 35 U.S.C. 154(b) by 98 days.

(21) Appl. No.: 15/063,936

(22) Filed: Mar. 8, 2016

Related U.S. Application Data

(60) Provisional application No. 62/130,086, filed on Mar. 9, 2015, provisional application No. 62/263,934, filed on Dec. 7, 2015.

(51) Int. Cl.
| | | |
|---|---|---|
| *G06F 15/16* | (2006.01) | |
| *G06F 8/60* | (2018.01) | |
| *H04L 29/06* | (2006.01) | |
| *H04B 1/3827* | (2015.01) | |
| *G06Q 30/02* | (2012.01) | |

(52) U.S. Cl.
CPC ........... *G06F 8/60* (2013.01); *G06Q 30/0241* (2013.01); *H04B 1/385* (2013.01); *H04L 67/42* (2013.01)

(58) Field of Classification Search
CPC .............................. G06F 8/60; G06Q 30/0241
USPC .................................................. 709/219, 203
See application file for complete search history.

(56) References Cited

U.S. PATENT DOCUMENTS

| | | | |
|---|---|---|---|
| 9,864,428 B2 * | 1/2018 | Zhang | G06F 3/011 |
| 2014/0310386 A1 * | 10/2014 | Srinivasan | H04L 65/605 709/219 |
| 2014/0325448 A1 | 10/2014 | Han et al. | |
| 2015/0020010 A1 | 1/2015 | Hale et al. | |
| 2015/0052253 A1 * | 2/2015 | Johnson | H04L 61/1511 709/226 |
| 2015/0062022 A1 * | 3/2015 | Rabii | G06T 1/20 345/173 |
| 2015/0170249 A1 * | 6/2015 | Cockcroft | G06Q 30/0627 705/26.63 |
| 2015/0222576 A1 * | 8/2015 | Anderson | G06F 9/4443 715/752 |

(Continued)

OTHER PUBLICATIONS

Gibbs et al., "Apple Watch: available Apr. 24 for between $349 and $17,000," downloaded from: https://www.theguardian.com/technology/2015/mar/09/apple-watch-available-april-24-for-between-349-and-10000, The Guardian US edition, Mar. 9, 2015.

(Continued)

*Primary Examiner* — Duyen My Doan
(74) *Attorney, Agent, or Firm* — Weaver Austin Villeneuve & Sampson LLP

(57) ABSTRACT

Described systems and methods allow executing complex software applications on a wearable electronic device such as a smartwatch, while reducing energy consumption. Instead of installing the complete code necessary to carry out all aspects of the respective application, some embodiments install a subset of program instructions on the wearable device, and dynamically fetch selected fragments of code from a remote server computer system onto the wearable device, as needed to carry out specific operations. Such code fetches may be triggered, for instance, by the user's pressing a button of the wearable device, or by a gesture of the user.

26 Claims, 11 Drawing Sheets

(56) References Cited

U.S. PATENT DOCUMENTS

2015/0355800 A1* 12/2015 Cronin ............... G06F 3/0484
                                                                           715/835

OTHER PUBLICATIONS

Seifert, "Making Time: how Pebble built its next smartwatch," downloaded from: http://www.theverge.com/2015/2/24/8091175/pebble-time-watch-wearable-platform-eric-migicovsky-interview, The Verge, Feb. 24, 2015.

Pebble, "Pebble UX design guide Release V1", downloaded from: http://assets.getpebble.com.s3-website-us-east-1.amazonaws.com/dev-portal/UX-Design-Guide-v1.1.pdf, 2013, 2014; the year of the publication is sufficiently earlier than the effective U.S. filing date and any foreign priority date so that the particular month of publication is not an issue.

Reddit, "One pebble—two phones, how to share?", downloaded from: https://www.reddit.com/r/pebble/comments/2237hg/android_one_pebble_two_phones_how_to_share/?ref=search_posts, post submitted on Apr. 3, 2014.

Reddit, "Can you tie several Pebbles to one phone?", downloaded from: https://www.reddit.com/r/pebble/comments/221nvw/can_you_tie_several_pebbles_to_one_phone/?ref=search_posts, post submitted on Apr. 2, 2014.

Wang et al., "Integrity Protection for Code-on-Demand Mobile Agents," Journal of Systems and Software, vol. 60, Issue 3, pp. 211-221, downloaded from: https://www.researchgate.net/researcher/9579357_Tianhan_Wang, Feb. 15, 2002.

* cited by examiner

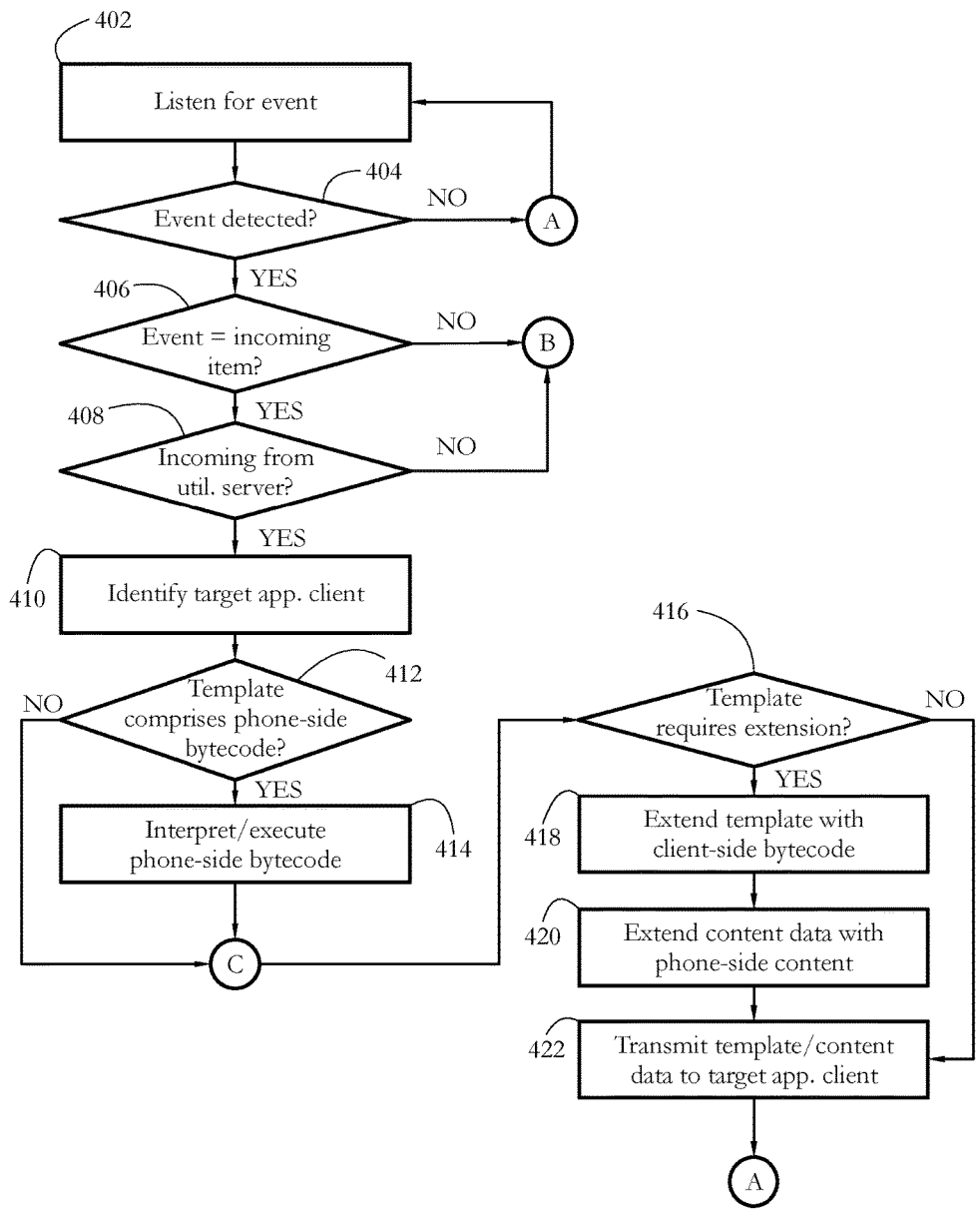
FIG. 15-A

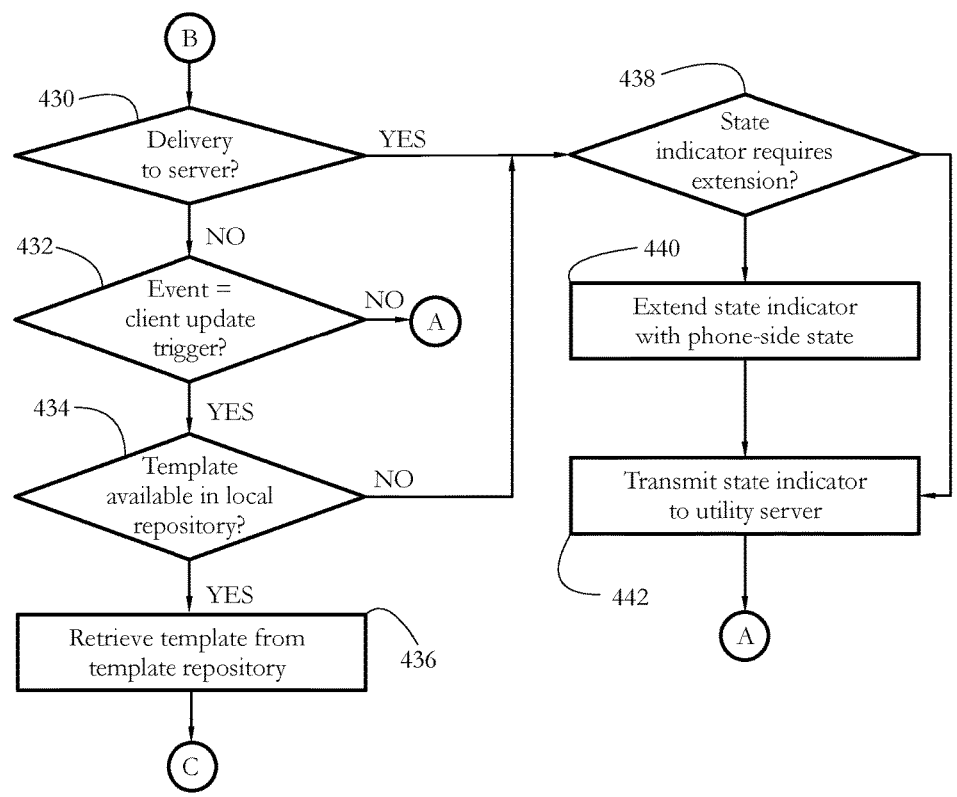
FIG. 15-B

SYSTEMS AND METHODS FOR DISTRIBUTING APPLICATION TEMPLATES TO WEARABLE CLIENT DEVICES

RELATED APPLICATIONS

This application claims the benefit of the filing date of U.S. provisional patent applications No. 62/130,086, filed on Mar. 9, 2015, entitled "Systems and Methods for Distributing Application Templates to Wearable Client Devices", and No. 62/263,934, filed on Dec. 7, 2015, entitled "Hybrid Smart-Analog Watch", the entire contents of which are incorporated by reference herein.

BACKGROUND

The invention relates to systems and methods for operating mobile, wearable computing devices.

In recent years, the development of mobile computing has made wearable computing devices an appealing alternative to conventional accessories such as watches, jewelry, etc. By incorporating a processor, memory, and a communication device, wearable devices may perform a variety of computational tasks and display a wealth of information to the wearer. Some such devices are capable of communicating with other electronic devices, such as personal computers, telephones, etc., for instance to receive user notifications, messages, and other rich content from the Internet. Some wearable devices execute an operating system and a plurality of applications, commonly referred to as apps. Such apps may receive input from a user/wearer of the respective device, may measure various physical or physiological quantities (e.g., temperature, pressure, heart rate), may measure or otherwise automatically determine a user context and activity (e.g., walking, running, sleeping), and may communicate such data to a remote computing system.

The small size of wearable computing devices inherently limits their power supply. Various energy-saving techniques and strategies were therefore devised specifically for such gadgets. One exemplary technique maintains the device in a low-power sleep mode, and only powers up the processor when needed to perform certain operations. Another conventional power-saving technique comprises pairing the wearable device with a more powerful computing platform such as a mobile telephone, and offloading some of the computations required to operate the wearable device onto the paired computer. In such configurations, the wearable device may become an extension of the mobile telephone, for instance.

As the number and diversity of wearable devices increases, there is a strong interest in developing other effective power-saving techniques.

SUMMARY

According to one aspect, a mobile telephone comprises at least one hardware processor and a memory. The at least one hardware processor is configured in response to receiving from a smartwatch a client state indicator comprising an indicator of a current state of a mobile application executing on the smartwatch, to transmit the client state indicator to a remote utility server. The at least one hardware processor is further configured, in response to transmitting the client state indicator, to receive from the utility server a client-side code fragment comprising program instructions instructing the smartwatch to perform a behavior including displaying a set of content data on an output device of the smartwatch. The client-side code fragment is determined by the utility server. Determining the client-side code fragment comprises the utility server formulating a request for the content data to a remote application server, the request formulated according to the client state indicator. The at least one hardware processor is further configured, in response to receiving the client-side code fragment, to transmit the client-side code fragment to the smartwatch.

According to another aspect, a computer system comprises at least one hardware processor and a memory. The at least one hardware processor is configured to receive a client state indicator from a mobile telephone communicatively coupled to a smartwatch, the client state indicator sent by the mobile telephone in response to receiving the client state indicator from the smartwatch. The smartwatch is configured to send the client state indicator during execution of a mobile application, in response to detecting an event triggering the mobile application to perform a behavior including displaying a set of content data on an output device of the smartwatch. The at least one hardware processor is further configured, in response to receiving the client state indicator, to transmit a request for the content data to a remote application server, the request formulated according to the client state indicator. The at least one hardware processor is further configured, in response to transmitting the request, to receive the content data from the application server. The at least one hardware processor is further configured, in response to receiving the content data, to formulate a client-side code fragment comprising program instructions instructing the smartwatch to perform the behavior, the client-side code fragment formulated according to the client state indicator and further according to the content data. The at least one hardware processor is further configured to transmit the client-side code fragment to the mobile telephone for distribution to the smartwatch.

According to another aspect, a smartwatch comprises at least one hardware processor and a memory. The at least one hardware processor is configured to execute a mobile application, and further configured to detect an event occurring during execution of the mobile application, the event triggering the mobile application to perform a behavior including displaying a set of content data on an output device of the smartwatch, the set of content data retrieved from a remote application server. The at least one hardware processor is further configured, in response to detecting the event, to transmit a client state indicator to a mobile telephone, the client state indicator comprising an indicator of a current state of the mobile application. The at least one hardware processor is further configured, in response to transmitting the client state indicator, to receive from the mobile telephone a client-side code fragment comprising program instructions instructing the smartwatch to perform the behavior, the client-side code fragment determined by a remote utility server in communication with the mobile telephone, wherein determining the client-side code fragment comprises the utility server formulating a request for the set of content data to the application server, the request formulated according to the client state indicator. The at least one hardware processor is further configured, in response to receiving the client-side code fragment, to execute the client-side code fragment to perform the behavior.

According to another aspect, a non-transitory computer-readable medium stores processor instructions which, when executed by at least one hardware processor of a mobile telephone, cause the mobile telephone, in response to receiving from a smartwatch a client state indicator comprising an indicator of a current state of a mobile application executing on the smartwatch, to transmit the client state indicator to a remote utility server. Executing the processor instructions further causes the mobile telephone, in response to transmitting the client state indicator, to receive from the utility server a client-side code fragment comprising program instructions instructing the smartwatch to perform a behavior including displaying a set of content data on an output device of the smartwatch, wherein the client-side code fragment is determined by the utility server, wherein determining the client-side code fragment comprises the utility server formulating a request for the content data to a remote application server, the request formulated according to the client state indicator. Executing the processor instructions further causes the mobile telephone, in response to receiving the client-side code fragment, to transmit the client-side code fragment to the smartwatch.

According to another aspect, a non-transitory computer-readable medium stores processor instructions which, when executed by at least one hardware processor of a smartwatch, cause the smartwatch to detect an event occurring during execution of a mobile application, the event triggering the mobile application to perform a behavior including displaying a set of content data on an output device of the smartwatch, the set of content data retrieved from a remote application server. Executing the processor instructions further causes the smartwatch, in response to detecting the event, to transmit a client state indicator to a mobile telephone, the client state indicator comprising an indicator of a current state of the mobile application. Executing the processor instructions further causes the smartwatch, in response to transmitting the client state indicator, to receive from the mobile telephone a client-side code fragment comprising program instructions instructing the smartwatch to perform the behavior, the client-side code fragment determined by a remote utility server in communication with the mobile telephone, wherein determining the client-side code fragment comprises the utility server formulating a request for the set of content data to the application server, the request formulated according to the client state indicator. Executing the processor instructions further causes the smartwatch, in response to receiving the client-side code fragment, to execute the client-side code fragment to perform the behavior.

BRIEF DESCRIPTION OF THE DRAWINGS

The foregoing aspects and advantages of the present invention will become better understood upon reading the following detailed description and upon reference to the drawings where:

FIG. 15-A shows an exemplary sequence of steps performed by the smartphone according to some embodiments of the present invention.

FIG. 15-B shows a continuation of the exemplary sequence of steps illustrated in FIG. 14.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. The term bytecode herein refers to a multiple-platform encoding of a computer program, in the sense that bytecode instructions may be delivered in identical form to different platforms. In contrast to bytecode instructions, native processor instructions comprise instructions specific to the physical or virtual processor that executes the respective instructions. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more microprocessors) programmed to perform the methods described herein, as well as computer-readable media encoding instructions to perform the methods described herein.

The following description illustrates embodiments of the invention by way of example and not necessarily by way of limitation.

Figure 1:
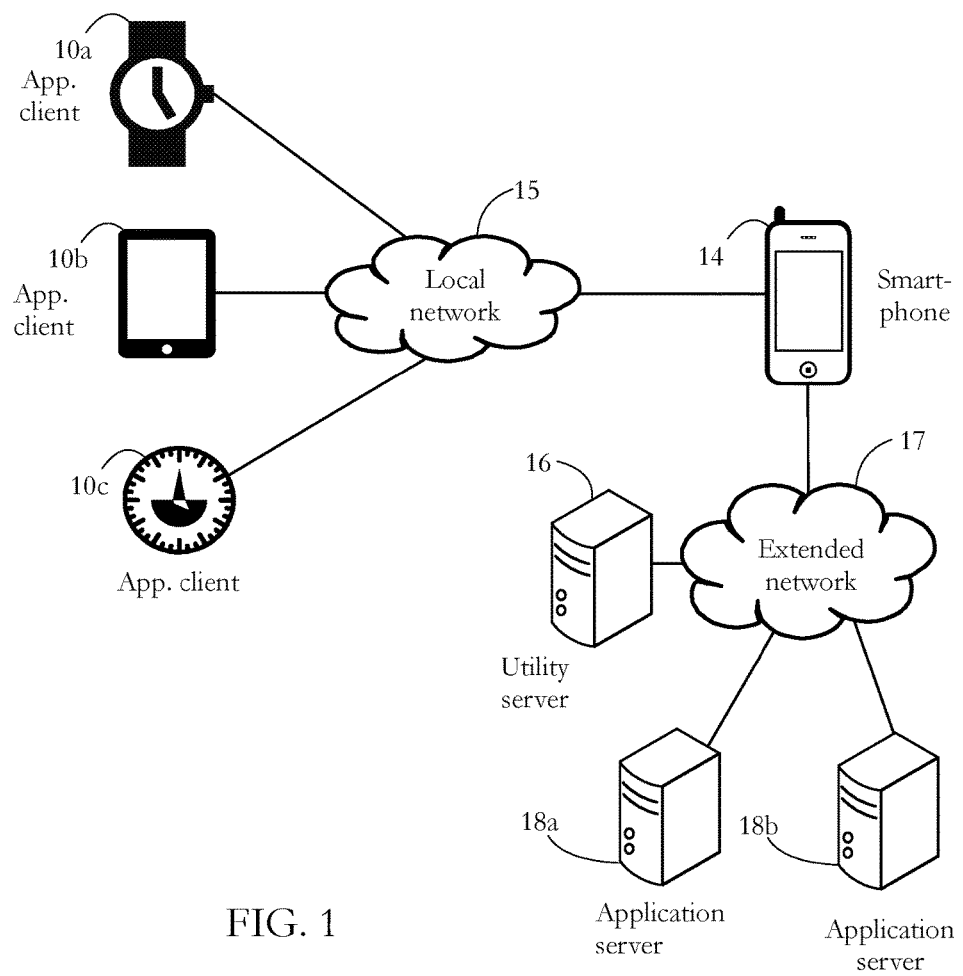
FIG. 1 shows an exemplary configuration wherein a plurality of application client devices collaborate with a smartphone, utility server and application servers according to some embodiments of the present invention.

FIG. 1 shows a system comprising a plurality of application client devices 10a-c communicatively coupled to a smartphone 14 via a local network 15. Exemplary application clients 10a-c include, among others, a smartwatch, a fitness monitor, a tablet computer, a thermostat, a mobile telephone, a smart TV, a game console, a refrigerator, or any other electronic device having a processor and a memory. In one example, all application clients 10a-c belong to a specific user. Some application clients 10a-c may be located in proximity to each other, for instance within the same house. Exemplary local networks/links 15 include a local area network (LAN) enabled using wireless communication devices/protocols, and a Bluetooth® link, among others. In some embodiments, all application clients 10a-c execute a version of a mobile software application configured to provide a specific service to a user of the respective application client, for instance to allow the user to read email, to call a taxi, to measure a fitness activity, etc.

Smartphone 14 is further communicatively coupled to a utility server 16 via an extended network 17, such as the Internet. Parts of extended network 17 may also include a mobile telecommunication network (e.g. a 3G network). In a typical embodiment, application clients 10a-c use smartphone 14 as a vehicle for transmitting and/or receiving data to and from utility server 16. Such a configuration may allow application clients 10a-c to achieve complex functionality and mobility, while saving power. Server 16 may further communicate with a set of application servers 18a-b over extended network 17. Each server 16, 18a-b generically represents a set (e.g., cluster) of computer systems, which may not be directly connected or in proximity to each other. Servers 16 and 18a-b may be owned by distinct entities.

Utility server 16 may act as intermediary or shim between application server(s) 18a-b and clients 10a-c. In some embodiments, for instance, utility server 16 requests content data from application servers 18a-b on behalf of clients 10a-c, and in response, processes and/or packages the respective content data by adding executable code formulated specifically for each application client 10a-c, and sends the respective code to the clients for execution. The respective code may instruct each client system on a manner of displaying the respective content data. In one such example using FIG. 1 as illustration, application servers 18a and 18b perform the server-side operations of a social network service (e.g. FACEBOOK®) and a taxi dispatcher service, respectively. Meanwhile, application clients 10a-c perform the client-side operations of such services, e.g., offer users access to the respective services.

Figure 2:
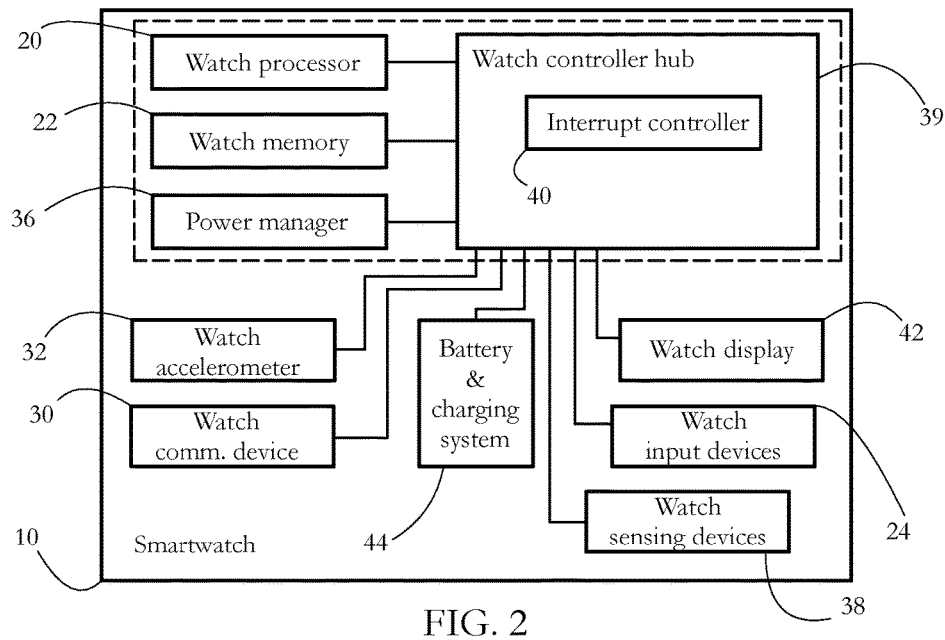
FIG. 2 shows an exemplary hardware configuration of a smartwatch according to some embodiments of the present invention.

FIG. 2 shows an exemplary hardware configuration of a client system 10 according to some embodiments of the present invention. For simplicity and without loss of generality, the following disclosure will use a smartwatch as a typical example of application client. Smartwatch 10 comprises a wearable computing device configurable to display the current time. Some embodiments of smartwatch 10 are configured to be worn primarily attached to a user's wrist. Exemplary smartwatches 10 include watches, fitness bands, and electronic jewelry, among others. A skilled artisan will understand that the systems and methods described below may be adapted to another type of application client, such as a tablet computer, game console, etc. For instance, the hardware configuration of other application clients may differ slightly from the configuration illustrated in FIG. 2.

The exemplary hardware configuration of FIG. 2 includes a watch processor 20, a watch memory 22, and a watch power manager 36, all interconnected via a watch controller hub 39. Processor 20 may comprise an integrated circuit (e.g. microprocessor, integrated circuit formed on a semiconductor substrate) configured to execute computational and/or logical operations with a set of signals and/or data. Such operations may be encoded and delivered to processor 20 in the form of processor instructions (e.g., machine code). Memory unit 22 may comprise volatile computer-readable media (e.g. RAM) storing instructions and/or data accessed or generated by processor 20 in the course of carrying out computations. In some embodiments, processor 20 may operate at variable clock speed, and may be configurable to switch from one clock speed to another, for instance so that various computation tasks are carried out at distinct clock speeds. In one such example, computationally-intensive and/or time-sensitive tasks requiring a quick response may execute at relatively high processor clock speed, while other tasks such as display refreshing and administrative tasks may execute at relatively low clock speed. Such switching may save battery, since clock speed typically correlates positively with power consumption. In some embodiments, power manager 36 is configured to select a clock speed for processor 20, and/or to switch processor 20 between a sleep state and an active state. The sleep state may comprise a state wherein some hardware devices (e.g., display, sensors) are powered off, and wherein execution of processor 20 is suspended. Exemplary sleep states include Advanced Configuration and Power Interface (ACPI) states S1-S4 of a computer system. The active state may comprise a state wherein processor 20 performs computation at a selected clock speed, and wherein hardware devices are powered. An exemplary active state is the ACPI state S0 of a computer system.

In some embodiments, smartwatch 10 further includes a watch display 42, a set of watch input devices 24, a watch communication device 30, and a set of watch sensing devices 38. Display 42 includes a physical device (e.g., liquid crystal display, light-emitting diode array) usable to communicate visual information to the user of smartwatch 10. Input devices 24 may include a button, crown, bezel, or other device enabling the user to input data into smartwatch 10 and/or to select an operating mode of smartwatch 10. In some embodiments, display 42 is integrated with input devices 24 into a touchscreen device. Communication devices 30 may include hardware/logic and software interfaces enabling smartwatch 10 to exchange data with other devices, for instance, to connect with smartphone 14 over local network 15. Communication devices 30 may operate according to communication protocols such as BLUETOOTH®. Watch sensing devices 38 include hardware configured to collect and/or process signals indicative of the environment of smartwatch 10. Some exemplary sensing devices 38 include, among others, a heart rate sensor, an infrared light sensor, an ambient light sensor, and a skin conductivity sensor.

Smartwatch 10 may further include a battery and charging system 44 comprising hardware configured to manage charging and power consumption. System 44 may include a solar cell, a kinetic energy convertor, or any other device configured to transform an external energy source into electricity for the purpose of charging the battery of smartwatch 10.

Smartwatch 10 may further include a watch accelerometer 32, comprising hardware and software configured to acquire and process a signal indicative of an acceleration or force experienced by smartwatch 10. In some embodiments, watch accelerometer 32 allows a determination of acceleration components along multiple axes, and/or a determination of a spatial orientation of smartwatch 10 with respect to such axes.

Controller hub 39 represents the plurality of system, peripheral, and/or other circuitry enabling the inter-communication of hardware devices of smartwatch 10. Hub 39 may include a memory manager configured to enable access of processor 20 to memory unit 22, and an interrupt controller 40 configured to receive and manage hardware interrupts received by processor 20 from peripheral devices such as communication device 30 and accelerometer 32, among others. In some embodiments, some hardware devices of smartwatch 10 may be integrated onto a common integrated circuit. For example, processor 20 may be integrated with memory 22 and with parts of controller hub 39 onto a single chip (e.g., dashed contour in FIG. 2).

Figure 3:
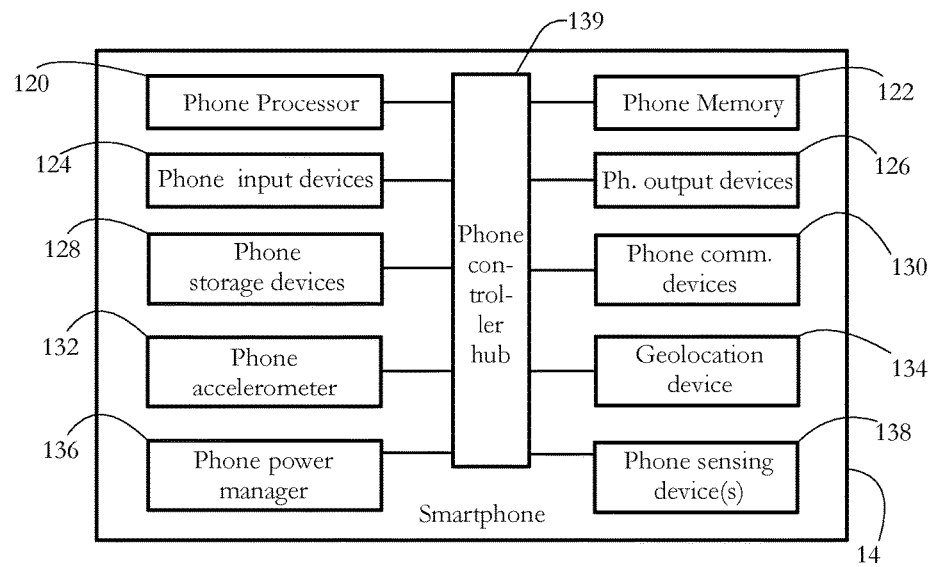
FIG. 3 illustrates an exemplary hardware configuration of a smartphone according to some embodiments of the present invention.

FIG. 3 shows an exemplary hardware configuration of smartphone 14 according to some embodiments of the present invention. Smartphone 14 comprises a mobile computing device configured to enable a user to carry out voice conversations with remote parties. Smartphone 14 comprises a phone processor 120 (e.g., a microprocessor formed on a semiconductor substrate), a phone memory unit 122, a set of phone input devices 124, a set of phone output devices 126, a set of phone storage devices 128, and a set of phone communication devices 130, all connected to a controller hub 139. Phone processor 120 comprise a physical device (e.g., microprocessor) configured to carry out processor instructions to compute or otherwise manipulate data. Such instructions and/or data may be stored in phone memory 122 (e.g., a RAM chip). Phone input devices 126 allow a user to interact with smartphone 14, and may include, for instance, a touchscreen and a set of buttons. Phone storage devices 128 include computer-readable media enabling the non-volatile storage, reading, and writing of software instructions and/or data. Exemplary storage devices 24 include flash memory, among others.

Smartphone 14 may further include a phone accelerometer 132, a geolocation device 134, a power management device 136, and a set of phone sensing devices 138, connected to controller hub 139. Phone accelerometer 132 includes hardware configured to produce a set of signals usable to determine parameters of a current motion and/or spatial orientation of smartphone 14. Geolocation device 134 comprises hardware configured to generate an indicator (e.g., a set of map coordinates) of a current location of smartphone 14. Exemplary geolocation devices 134 include a global positioning system (GPS) receiver, among others. In some embodiments, such as system-on-a-chip configurations, some or all of the devices illustrated in FIG. 3 may be integrated into a common hardware device, for instance, an integrated circuit.

Figure 4:
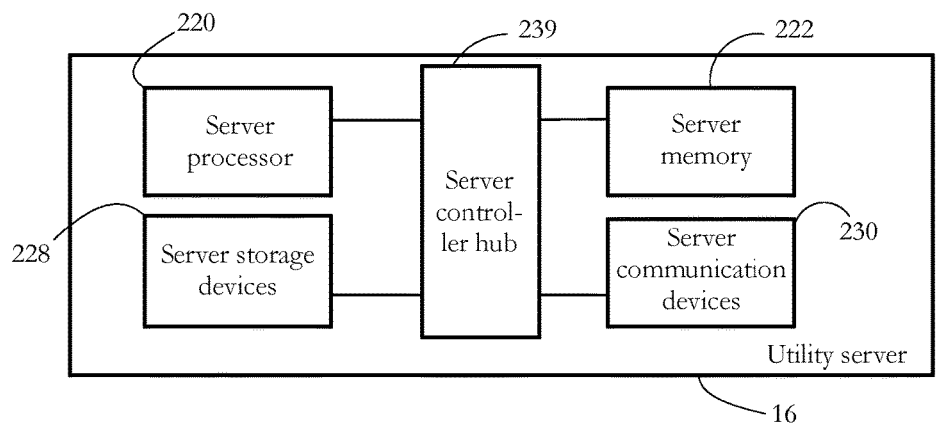
FIG. 4 shows an exemplary hardware configuration of a utility server according to some embodiments of the present invention.

FIG. 4 shows an exemplary hardware configuration of utility server 16. An exemplary server 16 is a computer system comprising a server processor 220 (e.g., a microprocessor), a server memory unit 222 (e.g., a DRAM chip), a set of storage devices 228, and a set of server communication devices 230, all interconnected by controller hub 239. Storage devices 228 include computer-readable media enabling the non-volatile storage, reading, and writing of software instructions and/or data. Exemplary storage devices 224 include magnetic and optical disks and flash memory devices, as well as removable media such as CD and/or DVD disks and drives. In a computer system, controller hub 239 may represent the plurality of system, peripheral, and/or chipset buses, and/or all other circuitry enabling the communication between processor 220 and devices 222, 228, and 230. For instance, controller hub 239 may include a memory controller, an input/output (I/O) controller, and an interrupt controller, among others. In another example, controller hub 239 may comprise a northbridge connecting processor 220 to memory 222, and/or a southbridge connecting processor 220 to devices 228 and 230, among others.

Wearable devices such as watches and fitness monitors are substantially limited in computing power, the limitation being mainly a consequence of the diminutive size of their power supply (battery). Some embodiments therefore lack a full-fledged operating system. Instead, smartwatch 10 may operate a thin software client capable of rendering images onto the display device (e.g., screen) and performing a set of actions (herein termed a behavior). In some embodiments, executing a mobile application on smartwatch 10 therefore amounts to performing an application-specific behavior and displaying an application-specific set of visual elements. Such images and behaviors may be communicated to smartwatch 10 as part of a software package herein termed a template. A multitude of such templates may be remotely accessible for installation on smartwatch 10, for instance by way of an application store. In addition, in some embodiments of the present invention, templates may be automatically and dynamically downloaded from utility server 16 in response to events occurring on smartwatch 10, such as a user's pressing of a button, or a motion of smartwatch 10. The process of dynamic updating of templates will be described in detail below.

Figure 5:
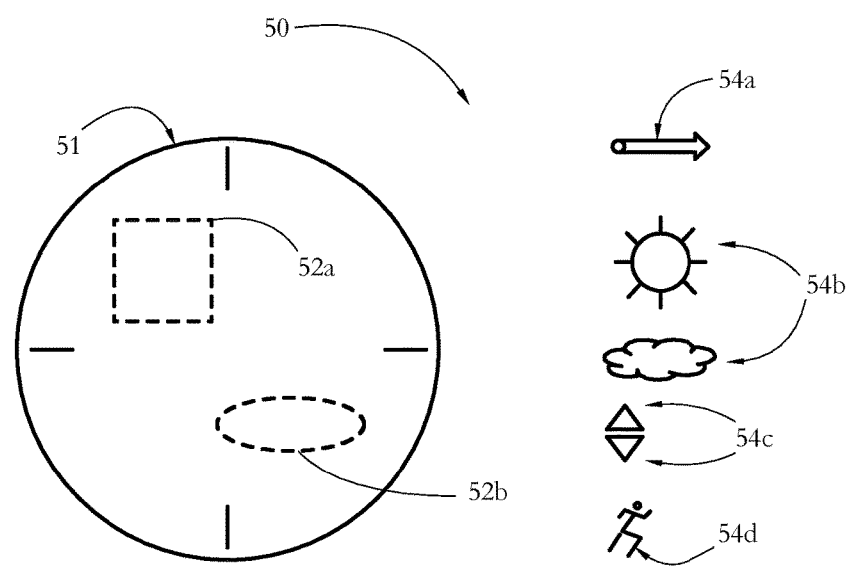
FIG. 5 illustrates exemplary components of a smartwatch template according to some embodiments of the present invention.

FIG. 5 shows exemplary components of a template 50 according to some embodiments. Template 50 may comprise a set of graphic elements and a set of behaviors. Graphic elements illustrated in FIG. 5 include a clockface image 51 and a set of symbols 54*a-d*. Exemplary symbols 54*a-d* include, among others, a clock hand 54*a*, a set of weather symbols 54*b*, a set of stock symbols 54*c* and a set of fitness symbols 54*d*. Template 50 may further include data defining a set of screen placeholders 52*a-b*. In some embodiments, each placeholder 52*a-b* represents a specific region of watch display 42, as indicated for instance by a set of screen coordinates. Template 50 may be configured to display an image in each placeholder 52*a-b*, the respective image selected or constructed according to dynamic content data retrieved from application server(s) 18*a-b* via smartphone 14. Exemplary content data includes, among others, weather, stock, map, and fitness indicators, electronic messages (e.g., email), calendar notifications, etc. Images displayed in placeholders 52*a-b* may include symbols and rendered text. Filling placeholders 52*a-b* with a representation of content data is herein referred to as instantiating template 50 with the respective content data.

Exemplary behaviors associated with template 50 include a set of operations performed by smartwatch 10 during rendering and/or instantiation of template 50. Behaviors may thus define a manner of parsing, processing and/or displaying content data to a user. In one exemplary behavior, smartwatch 10 receives content data indicating that rain is imminent. In response to receiving the content data, template 50 selects a rain icon from weather symbols 54*b*, and displays the rain icon on the clock face, within an appropriate placeholder. In another exemplary behavior, smartwatch 10 detects that the user is currently running, and automatically switches to displaying a count of steps and/or a current heart rate (in the current example, template 50 is instantiated with the user's current heart rate or count of steps). Other behaviors may indicate a manner of moving various objects on screen, for instance, changing the position and orientation of clockhand 54a to indicate the current time, animating an icon, etc. Another exemplary behavior defines a manner of responding to a user event, such as the user's pressing of a button, or a gesture of the user's hand. For instance, in one template, pressing a button may cause smartwatch 10 to scroll through a list of user options, while in another template, pressing the same button may cause smartwatch 10 to switch from displaying the current time to displaying the weather forecast.

Templates may be modular. In one such example, a master template comprises a plurality of sub-templates, each sub-template associated with a distinct placeholder 52a-b. In another example, individual sub-templates may be associated with each input device of smartwatch 10 (button, bezel, etc.), each such sub-template defining a manner of reacting to a user's activating the respective input device. In some embodiments, individual sub-templates may be associated with each operating mode/screen of a mobile application. In one exemplary embodiment wherein the clockface comprises multiple dials or sets of clock hands, the behavior of each dial may be defined by a distinct sub-template. In another example, with each press of a button, a user may cycle through multiple sub-templates, each related to the same dial.

Behaviors may be expressed as a set of program instructions. Such code may take various forms. In some embodiments, behaviors are coded in native instructions of watch processor 12, i.e., instructions from the instruction set architecture (ISA) of processor 12. In an alternative, preferred embodiment, behaviors are coded in a platform-independent language herein termed bytecode. Examples of bytecode include Java®, Javascript®, and ActionScript®, among others. One advantage of such an encoding is portability. The downside of using bytecode to express template behaviors is that, to make bytecode executable by processor 12, it typically needs to be translated into native processor instructions by compiler or interpreter software executing on smartwatch 10. Such interpreting software may increase the complexity and power consumption of smartwatch 10.

Figure 6:
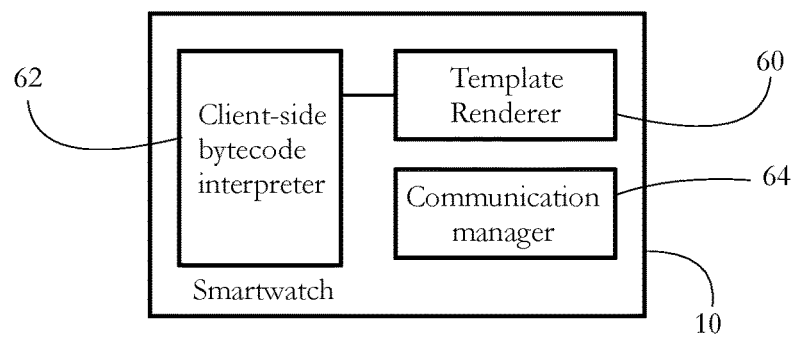
FIG. 6 shows exemplary software components executing on a smartwatch according to some embodiments of the present invention.

FIG. 6 shows exemplary software components executing on an application client (smartwatch 10) according to some embodiments of the present invention. The exemplary smartwatch of FIG. 5 executes a template renderer 60, a client-side bytecode interpreter 62 connected to template renderer 60, and a communication manager 64. In some embodiments, template renderer 60 configures watch display 42 to display a visual representation of a template to a user of smartwatch 10. Client-side bytecode interpreter 62 may interpret client-side template bytecode to enable processor 12 to execute the behavior/set of actions encoded in the respective template. Communication manager 64 may manage data exchanges between smartwatch 10 and smartphone 14, e.g., receive templates and/or content data from smartphone 14 via a BLUETOOTH® link, as further illustrated below.

Figure 7:
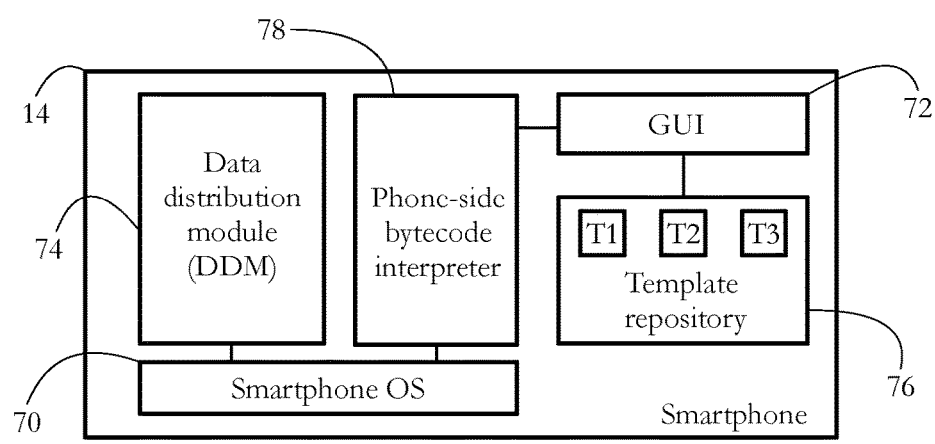
FIG. 7 shows exemplary software components executing on a smartphone, according to some embodiments of the present invention.

FIG. 7 shows exemplary software components executing on smartphone 14. Such software typically comprises an operating system (OS) 70, which provides an interface between the hardware of smartphone 14 and other software executing on phone processor 120. Exemplary phone operating systems include iOS® and Android®, among others. The illustrated software components further include a data distribution module (DDM) 74 and a GUI 72 connected to a template repository 76. GUI 72 displays a set of configuration options to a user of smartphone 14, thus allowing the user to manage applications/templates executing on smartwatch 10. For instance, GUI 72 may allow the user to choose among a plurality of available templates. In some embodiments, GUI 72 is further configurable to display content data received from utility server 16, for instance advertising messages, notifications, alerts, etc.

In some embodiments, DDM 74 is configured to selectively distribute templates and/or content data to various application clients 10a-c, as shown in more detail below. Template repository 76 is configured to store a plurality of templates locally, on computer readable media of smartphone 14, and to allow other software to selectively access such templates.

Some embodiments of smartphone 14 further execute a phone-side bytecode interpreter 78 configured to interpret a phone-side fragment of code for execution on smartphone 14, the phone-side code received from utility server 16 as part of a data exchange with smartwatch 10. More details of such functionality are given below.

Figure 8:
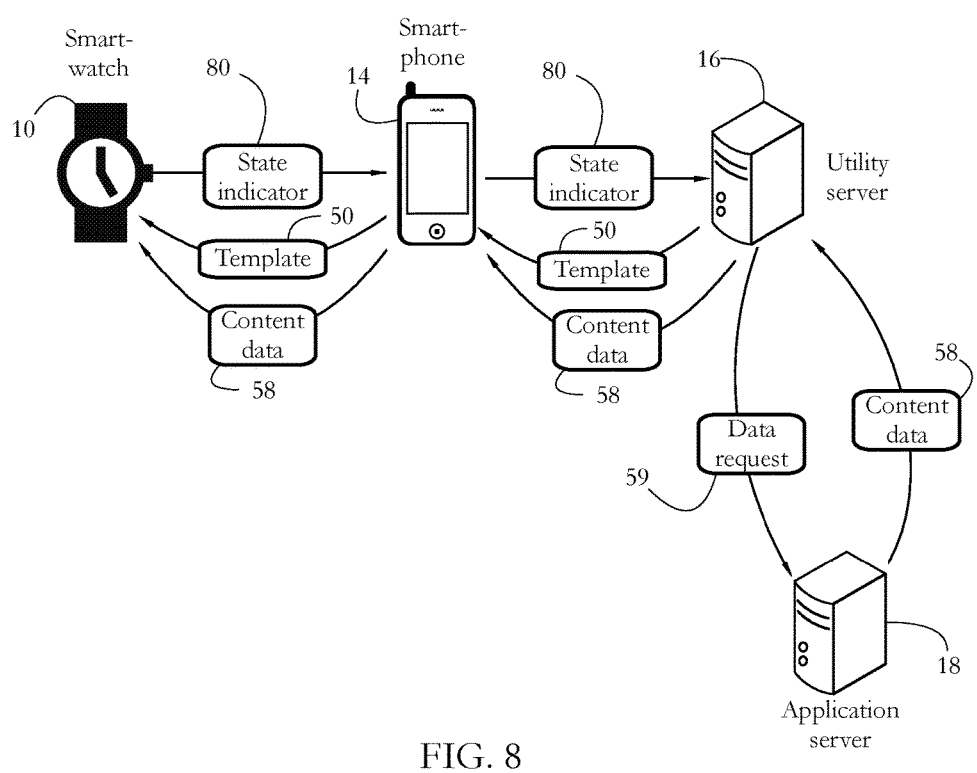
FIG. 8 shows an exemplary data exchange between a smartwatch, smartphone, utility server and application server, according to some embodiments of the present invention.

FIG. 8 illustrates an exemplary data exchange between a smartwatch, smartphone, utility server and application server. In some embodiments, to keep power consumption low and memory requirements to a minimum, template complexity is kept in check. Instead of downloading a large, complex template with multiple behaviors for various elements and situations, some embodiments dynamically fetch (sub)templates when needed to display certain information or to perform certain behaviors. Taking the example of a taxi dispatch application, smartwatch 10 may install a master template comprising static visual elements (e.g., logo, welcome screen, a set of symbols) and further comprising an encoding of a set of generic behaviors (e.g. code enabling switching between various screens or execution modes). However, the master template may lack the code for specific behaviors associated with individual screens and/or situations; such code may be dynamically fetched in response to an event which triggers the respective specific behavior.

Various events may trigger template fetches. Some triggers are on smartwatch 10; such events determine smartwatch 10 to actively request a template (pull paradigm). Other triggers are on smartphone 14, utility server 16, and/or application server(s) 18a-b; such events may determine server 16 and/or smartphone 14 to automatically send template 50 to smartwatch 10 (push paradigm). Some fetches are automatic, for instance triggered by events which are not caused by an interaction with the user. In one such example, a calendar event triggers a notification of an upcoming meeting. In response to receiving such a notification, smartwatch 10 may fetch a template configured to display the time remaining until the meeting.

Other trigger events include user events, such as the user pushing a button, rotating the watch bezel, making a gesture with the hand carrying smartwatch 10, issuing a verbal command, etc. User events may trigger a specific behavior of template 50, such as a change in the information displayed on screen, or a change in the manner the respective information is displayed by smartwatch 10. In one such example, a template responds to a button press by switching from displaying the current time to displaying a set of news headlines. In another example, software executing on smartwatch 10 and/or smartphone 14 may automatically detect a change of a user context, for instance, that the user is currently leaving home and going to work. Template 50 may respond to the change of user context by switching from displaying the current time to displaying a schedule of business meetings for the day. The actual code for displaying the day's agenda and/or the content data comprising an indicator of the actual agenda events may be fetched dynamically from utility server 16 in response to the change of user context.

As illustrated in FIG. 8, in response to detecting the occurrence of a trigger event, some embodiments of smartwatch 10 transmit a state indicator 80 to smartphone 14, the state indicator indicative of a current state of smartwatch 10. Smartphone 14 may forward state indicator 80 to utility server 16, possibly adding a phone-side set of data to indicator 80, the phone-side data indicative of a current state of smartphone 14. The client state indicator received from smartphone 10 and the phone state indicator may be transmitted to utility server 16 as separate communications, or as part of a single aggregate package.

In response to receiving state indicator 80, utility server 16 may formulate a data request 59 according to state indicator 80, and transmit request 59 to an appropriate application server 18, such as servers 18a-b in FIG. 1. In response to receiving request 59, the respective application server may return a set of content data 58 to utility server 16. Server 16 may process content data 58 and re-package it with a template 50, before transmitting template 50 and content data 58 to utility server 16 for further distribution to the appropriate client system. Template 50 may, for instance, comprise bytecode instructing smartwatch 10 and/or smartphone 14 on a manner of displaying content data 58. In some embodiments, utility server 16 may also enhance content data 58 received from application server 18 with additional information (e.g. notifications, advertising messages, etc.)

In response to receiving template 50 and/or content data 58 from server 16, smartphone 14 may identify an intended recipient of the respective data items, and transmit template 50 and/or data 58 to the respective recipient (e.g., smartwatch 10). In some embodiments, smartphone 14 may further enhance template 50 and/or content data 58 with additional information (e.g., a current geolocation indicator) before transmitting items 50 and/or 58 to smartwatch 10.

One exemplary scenario illustrated by the exchange in FIG. 8 involves using a mobile application executing on smartwatch 10 to call a taxi. The user may activate an input device of smartwatch 10 (e.g., press a button), or a watch accelerometer (e.g., by waving the hand in a particular way), to indicate the intention of calling a taxi. In response to this user event, smartwatch 10 sends state indicator 80 to smartphone 14, thus triggering a request to a taxi application server 18 via utility server 16. Upon receiving state indicator 80 from smartwatch 10, smartphone 14 may add a geolocation indicator to state indicator 80 to communicate the user's current location to server 18, and transmit indicator 80 to utility server 16. In turn, utility server 16 may determine based on indicator 80 that the user is trying to call a taxi, and formulate a request to the respective application server offering taxi services. Server 18 may return content data 58 comprising a list of cars/drivers currently available in the vicinity of the user. In response to receiving data 58, utility server 16 may formulate template 50 with bytecode enabling smartwatch 10 to display the list and to receive input from the user indicating a choice of cars. Template 50 may also include some phone-side bytecode instructing smartphone 14 to perform a particular behavior while the user is waiting for the taxi. For instance, server 16 may determine that the taxi company currently has a promotion, and formulate template 50 with phone-side bytecode instructing smartphone 14 to display details of the promotion. In another example, the phone-side bytecode may instruct smartphone 14 to play a specific tune from the user's media library while the user is waiting. In some embodiments, content data 58 from the taxi application server will be supplemented by utility server 16 with various content information (such as announcements, advertisements, etc.). When template 50 and/or data 58 reach smartphone 14, smartphone 14 may forward such items to smartwatch 10. When the user indicates a choice of car/driver, the respective user event may trigger another sub-template fetch, the respective sub-template enabling smartwatch to indicate a waiting time and/or a message from the driver of the selected taxi.

In another exemplary scenario illustrated by FIG. 8, a user may execute a remote device management application on smartwatch 10, the application enabling the user to set the temperature in each of two separate rooms of the house. The two separate rooms have distinct models of smart thermostat, each model having a distinct set of configuration parameters. Instead of pre-installing a complex template on smartwatch 10, which would allow the user to set parameters for both thermostats right from the respective template, and instead of installing separate management applications for each thermostat, some embodiments of the present invention may fetch a master template including, for instance, a few background images and symbols, and minimal functionality. When the application is launched, it may send state indicator 80 to server 16. Server 16 may identify the user according to state indicator 80 and may further identify the two thermostats according to a subscription associated with the respective user (more details on subscriptions will follow). Utility server 16 may then return a template to the smartwatch, the template including code and/or image data for displaying an indicator of each thermostat, and enabling the user to choose which thermostat to configure. The user's choice of thermostat may trigger another template fetch, wherein the new template comprises code for receiving user input indicating a desired temperature. In an embodiment wherein the desired temperature may be set by rotating a bezel of smartwatch 10, the respective code may define a manner of translating the rotation of the bezel into numerical temperature data. The user's choice of temperature may trigger another state indicator 80 to be sent to server 16, wherein indicator 80 includes the user's choice of temperature. Utility server 16 may then formulate a request to application server 18 (in this case, for instance, a remote configuration server operated by the makers of the selected thermostat), the request instructing server 18 to remotely configure the respective thermostat to the desired temperature. Server 16 may then receive content data 58 from server 18, comprising an acknowledgement of the respective operation, and forward data 58 on to smartphone 14 for display on smartwatch 10 and/or smartphone 14.

Figure 9:
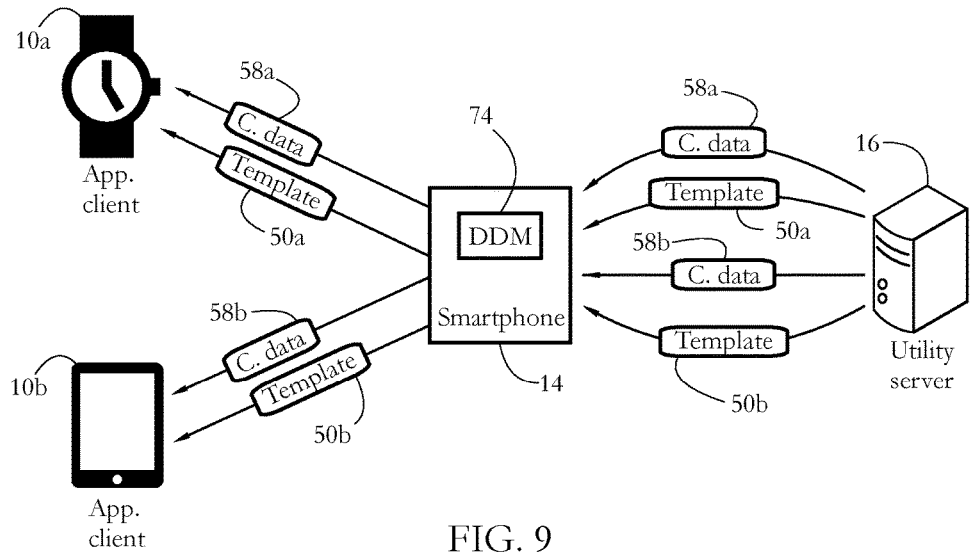
FIG. 9 shows an exemplary smartphone selectively distributing data to multiple clients according to some embodiments of the present invention.

FIG. 9 shows an exemplary data exchange wherein smartphone 14 selectively distributes templates and/or data to multiple clients 10a-b according to some embodiments of the present invention. In response to receiving a communication from utility server 16, data distribution module (DDM) 74 automatically identifies the intended recipient client, for instance, according to state indicator(s) 80 previously received from each client. In some embodiments, smartphone 14 then places the respective data item in an outbox, for delivery to the respective recipient client. If the recipient client is not currently available or reachable via local network 15, the template/data may be stored locally on smartphone 14, until delivery is successful, or until the respective data/template expires. The illustrated use of an outbox allows asynchronous communication between app clients 10*a-b* and servers 16 and 18*a-b*.

Figure 10:
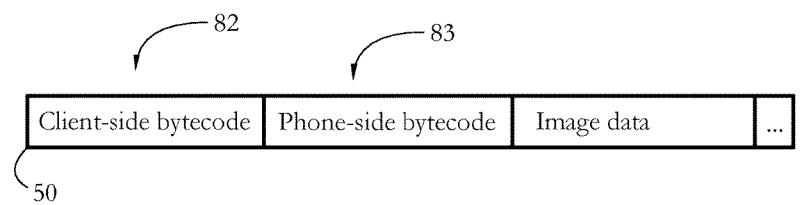
FIG. 10 illustrates an exemplary format of a smartwatch template according to some embodiments of the present invention.

FIG. 10 illustrates an exemplary data format of a template, according to some embodiments of the present invention. Template 50 may comprise a data structure having a client-side part, a phone-side part, or both. In some embodiments, the client and phone-side parts are transmitted as separate communications/data packages. As previously mentioned, template 50 may suffer various modifications during the data exchange between application server 18, utility server 16, smartphone 14 and lastly, smartwatch 10, as various actors may add or remove parts of the respective information. In an embodiment wherein behaviors are encoded using bytecode, template 50 may comprise a client-side bytecode 82, configured for execution on the application client (e.g. smartwatch 10), and a phone-side bytecode 83, configured for execution on smartphone 14. Template 50 may comprise additional data fields for storing static data such as images, text, various parameter values, etc.

Figure 11:
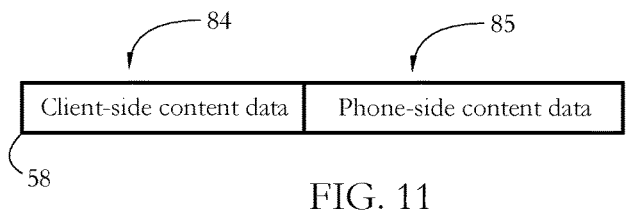
FIG. 11 illustrates an exemplary format of content data according to some embodiments of the present invention.

FIG. 11 illustrates an exemplary format of content data 58 according to some embodiments of the present invention. Such content data may be received from application servers 18*a-b*, and may be further modified by utility server 16 and/or smartphone 14 en route to the app client (e.g., smartwatch 10). Similarly to template 50, content data 58 may include a client-side content data 84 comprising items destined for the application client, and a phone-side content data 85 comprising items destined for smartphone 14.

Figure 12:
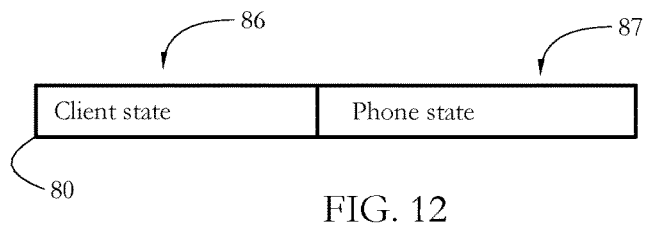
FIG. 12 illustrates an exemplary format of a state indicator according to some embodiments of the present invention.

FIG. 12 illustrates an exemplary format of state indicator 80 according to some embodiments of the present invention. As shown above, indicator 80 may include an indicator of a client state 86, and an indicator of a phone state 87. In some embodiments, client-side state indicator 86 includes a set of parameter values describing the current state of the respective app client. As such, indicator 86 may comprise current values of a set of parameters of the currently executing application: an indicator of a current screen/execution stage, an indicator of a currently executing template/sub-template, values of various template parameters (e.g., a choice of an item from a list), etc. In some embodiments, client state indicator 86 also includes an event indicator storing information related to user events, such as an indicator of which button was pressed, or a motion indicator (e.g., a value of an accelerometer signal), or an indicator of a user context (e.g., walking, running, a specific hand gesture). Client-side state indicator 86 may further comprise a set of indicators and/or identifiers of the respective device (e.g., type of device, serial number, make/model, International Mobile Subscriber Identity—IMSI, International Mobile Station Equipment Identity—IMEI, etc.).

Phone-side state indicator 87 comprises an indicator of a current state of smartphone 14. For instance, indicator 87 may include a set of application parameter values and/or a set of readings from the phone's sensors (e.g., a motion indicator, a geolocation indicator, a temperature indicator, etc.). In some embodiments, phone-side state indicator 87 comprises a user context indicator indicative of a current activity of the user of smartphone 14 (e.g., running, sleeping, etc.). Smartphone 14 may determine the user context by any method known in the art, for instance according to a current motion of the phone, according to a current location of the phone, according to the current time and/or by correlating the motion of the phone with a current motion of smartwatch 10.

Figure 13:
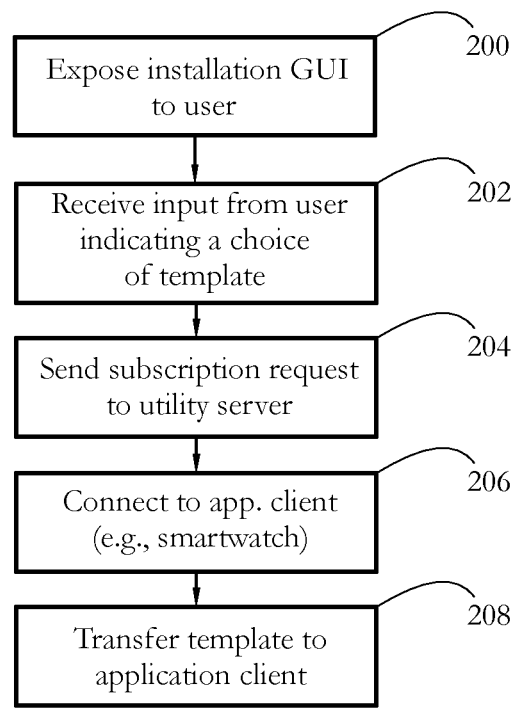
FIG. 13 shows an exemplary sequence of steps performed by the smartphone to install a mobile application on an application client according to some embodiments of the present invention.

In some embodiments, smartphone 14 is used as an installation assistant. FIG. 13 shows an exemplary sequence of steps performed by the smartphone during installation of a mobile application on an application client (e.g., smartwatch 10) according to some embodiments of the present invention. As shown above, each application may include a plurality of templates and sub-templates. To accelerate template delivery, several such available application templates/sub-templates may be pre-downloaded from utility server 16 and stored locally in template repository 76 on computer readable media of smartphone 14. Smartphone 14 may expose GUI 72 to the user (step 200), allowing the user to select a desired template for transfer to smartwatch 10, the template selected from the templates stored in local repository 76. Once a template is selected, in a step 204, smartphone 14 may send a subscription request to utility server 16 and deliver the respective template to smartwatch 10 (steps 206-208). In some embodiments, the subscription request includes an indicator of the selected template and an indicator of a device type of the respective app client (e.g., watch, tablet, mode/make, IMSI, etc.). In response to receiving the subscription request, utility server 16 may subscribe smartphone 14 to a data channel broadcasting content data 58 used by the respective application/template. Each such subscription may effectively create an association between smartphone 14 and the recipient of template(s) 50 (in this case, smartwatch 10), the association indicating smartphone 14 as the receiving device for the respective template(s) and/or content data 58. Subscription data further enable utility server 16 to properly formulate and/or format executable code/bytecode specifically for the recipient app client.

Figure 14:
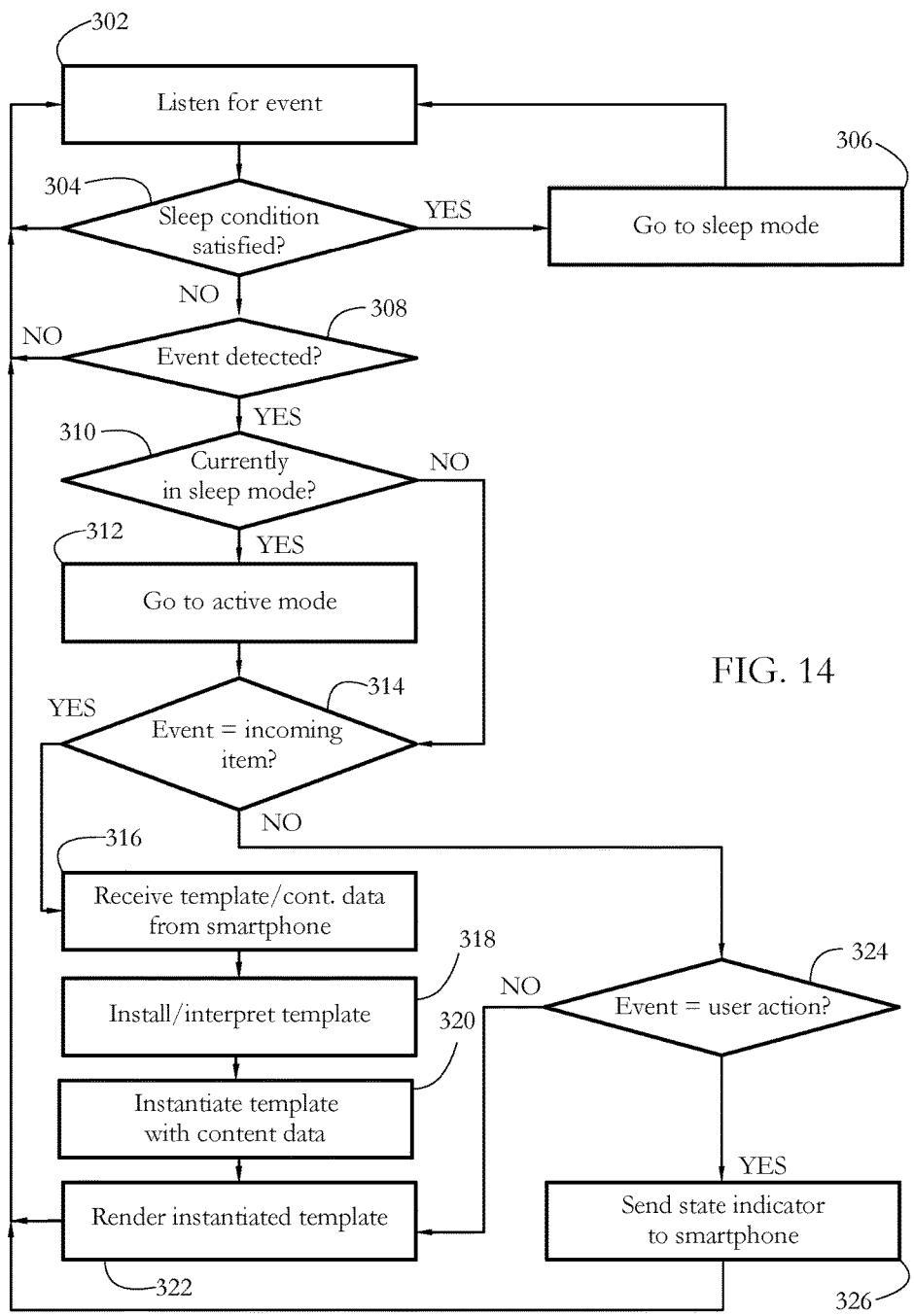
FIG. 14 illustrates an exemplary sequence of steps performed by the application client according to some embodiments of the present invention.

FIG. 14 illustrates an exemplary sequence of steps performed by smartwatch 14 according to some embodiments of the present invention. To minimize energy consumption and thus extend the time period between consecutive battery charges, the default state/operation mode of smartwatch 10 may be a sleep state. In an exemplary sleep state, most peripheral devices are in standby or are powered off, memory unit 22 (FIG. 2) is powered, while processor 20 (FIG. 2) is halted but may remain powered to maintain processor state. A set of steps 302-304-306 ensures that smartwatch 10 returns to the sleep state when a sleep condition is satisfied. An exemplary sleep condition comprises not detecting any event for an extended time period (e.g., longer than 1 second).

When an event is detected (step 308), a step 310 determines whether smartwatch 10 is currently in the sleep state. When yes, in a step 312, smartwatch 10 may switch to an active state. A possible event type includes receiving template content data from smartphone 14, for instance via a BLUETOOTH® link. If this is the case, in a sequence of steps 316-318-320-322 smartwatch 10 receives template and/or content data, installs and/or interprets template bytecode, instantiates template 50 with the respective content data 58 and renders the instantiated template. In one such exemplary sequence triggered by a weather notification, smartwatch 10 receives a template indicating a manner of animating a rain symbol, and executes the respective bytecode to indicate the probability of rain.

When the detected event is a user event (decision step 324), for instance when the user has pressed a button or executed a gesture, some embodiments formulate state indicator 80 with contents of the current state of smartwatch 10, and further transmit state indicator 80 to smartphone 14 (step 326), before returning to step 302. Gesture detection may comprise analyzing a movement of smartwatch 10, for instance, analyzing a signal received from watch accelerometer 32 (FIG. 2). In an exemplary embodiment, when the accelerometer signal exceeds a pre-determined threshold indicating that the watch is moving significantly, accelerometer 32 may generate a hardware interrupt, thus notifying processor 20 that a motion has occurred.

Yet another type of event occurring in smartwatch 10 includes scheduled events, such as events related to timekeeping and the display of the current time. In some embodiments, the display must be refreshed at regular time intervals (e.g., every minute, every second), for instance to update the position of a clock hand. An internal clock of smartwatch 10 may generate an interrupt with a predetermined periodicity, e.g., a predetermined count of clock tics. Such events may trigger a refresh of template 50 (step 322 in FIG. 14).

FIGS. 15-A-B illustrate an exemplary sequence of steps performed by smartphone 14 according to some embodiments of the present invention. In some embodiments, smartphone 14 will listen for an event (steps 402-404), such as receiving a communication from utility server 16 (FIG. 15-A), receiving a communication from smartwatch 10 (FIG. 15-B) or an event internal to smartphone 14 (FIG. 15-B). Upon receiving template 50 and/or content data 58, a step 410 identifies the target application client, e.g., according to information contained in a previously received state indicator, as shown above. When a received template comprises phone-side bytecode (decision step 412), smartphone 14 may interpret and execute it (step 414). In a further step 416, smartphone 14 may determine whether to supplement the received template with additional client-side bytecode from template repository 76 (an operation herein termed extending the template). When yes, a step 418 selectively retrieves the respective (sub)template from repository 76 and adds the respective bytecode to the template received from utility server 16. A further step 420 may similarly extend content data 58 with phone-side content data such as information extracted from smartphone's sensors or apps, e.g., a geolocation indicator, an indicator of temperature, an indicator of heart rate, etc. The extended template 50 and/or content data 58 are then transmitted to the intended recipient client system (i.e., smartwatch 10) in a step 422.

FIG. 15-B illustrates an exemplary sequence of steps performed when the smartphone event detected in step 404 is not a communication from utility server 16. When the respective event triggers a data delivery to utility server 16 (decision step 430), for instance when the event comprises receiving state indicator 80 from smartwatch, a step 438 determines whether state indicator 80 may be extended with a phone-side state. When yes, a sequence of steps 440-442 adds phone-side state data (e.g., a geolocation indicator indicative of the current location of smartphone 14) to indicator 80, before transmitting indicator 80 to utility server 16. The client-side state indicator and phone-side state indicator may be transmitted as separate items or as part of the same data structure.

Some embodiments of smartphone 14 maintain a collection of templates and/or sub-templates in repository 76, for instance including items recently received from utility server 16. Repository 76 may therefore be used as a cache, to reduce the count of template downloads from server 16 as much as possible, in order to accelerate template delivery to the end app client. Such optimizations rely on the observation that smartwatch 10 may repeatedly request the same (sub)template, for instance in response to the same type of event occurring on smartwatch 10. In such situations, instead of fetching the respective template every time from utility server 16, some embodiments of smartphone 14 may retrieve it from repository 76 and directly deliver it to smartwatch 10. The same logic may apply to some events internal to smartphone 14. In one such example, the geolocation sensor of smartphone 14 may detect that the user has left home and is probably on his/her way to work. Such a change of user context may trigger a change in the display of smartwatch 10, which may therefore require a (sub) template to perform the respective behavior. Such an event is herein termed a client update trigger. When one such event occurs, in a step 434, smartphone 14 may determine whether the required template is available in local repository 76. When yes, it may retrieve the respective template and transmit it to smartwatch 10. When no, smartphone 14 may advance to step 438 described above.

Figure 16:
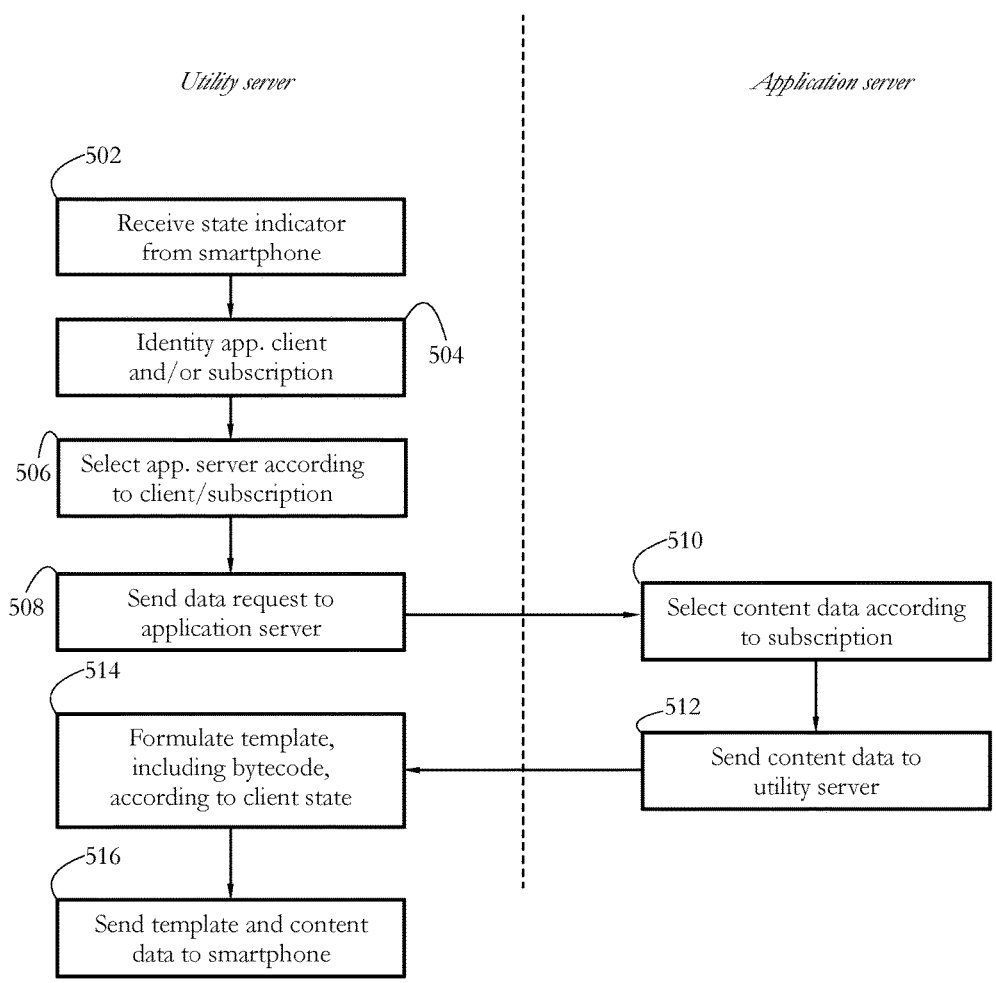
FIG. 16 shows an exemplary data exchange between the utility server and the application server according to some embodiments of the present invention.

FIG. 16 shows an exemplary data exchange between utility server 16 and application server(s) 18a-b (FIG. 1) according to some embodiments of the present invention. In response to receiving state indicator 80 from smartphone 14 (step 502), utility server 16 may identify the respective application client and/or subscription according to data contained in state indicator 80. In a step 506, utility server 16 may then select an appropriate application server according to state indicator 80. For instance, when state indicator 80 shows that the respective app client is currently executing a TWITTER® application, utility server determines that it has to send a data request to a TWITTER® server (as opposed to, e.g., a taxi dispatcher server). In a step 508, utility server 16 then formulates data request 59 and sends request 59 to the selected application server 18.

In response to receiving request 59, in a sequence of steps 510-512, application server 18 may select and/or formulate content data 58 according to request 59 and further according to parameters of the respective user subscription, and may send content data 58 to utility server 16.

In response to receiving content data 58 from application server 18, utility server 16 may formulate template 50 including client-side and/or phone-side bytecode according to the current state of app client 10 (as indicated by the previously received state indicator). The respective bytecode may be tailored to the specific device type of the respective application client. In some embodiments, utility server 16 maintains a collection of predefined templates, sub-templates, and/or client-side and phone-side code fragments on computer-readable media communicatively coupled to server 16. In such embodiments, formulating template 50 may comprise utility server 16 selectively retrieving an appropriate template and/or bytecode fragment from the local template repository according to state indicator 80. In response to formulating template 50, a step 516 transmits template 50 and/or content data 58 to smartphone 14 for distribution to the appropriate client system.

Some embodiments of the present invention rely on the observation that wearable devices such as watches and fitness monitors, among others, are substantially limited in computing power, the limitation being mainly a consequence of the diminutive size of their power supply (battery). Some embodiments therefore move the bulk of the computation from the wearable device to an assistant device, such as a smartphone. Some of the computation conventionally carried out on the wearable device may be further moved out onto one or more remote server computer systems. In order to still deliver a sophisticated user experience, in some embodiments the wearable device operates a thin software client capable of rendering a pre-defined template onto a display of the wearable device. The template may be instantiated using content data dynamically received from the remote server computer system via the smartphone. Templates and/or content data may be dynamically fetched onto the wearable device from a server computer system or from the smartphone. The wearable device may thus exhibit a rich and rapidly changing behavior, while the bulk of the underlying computation is taking part elsewhere.

In the conventional architecture of mobile applications, the entire code needed to execute all stages and/or operating modes of an application is typically delivered to the application client device (e.g., smartwatch) as part of an installation package. All code is therefore typically installed and configured for execution before the respective application is launched. In subsequent exchanges with an application server, the app client may receive content data with which to populate various predefined display fields. In contrast to such conventional mobile applications, in some embodiments of the present invention, the initial installation package only contains a minimal set of graphical elements (e.g., background images, symbols such as clock hands, various icons, etc.) and a subset of program instructions enabling a minimal functionality. Additional code fragments may then be fetched dynamically, when needed to extend said functionality. The way the wearable device looks, communicates data to the user, and responds to inputs from the user may therefore change repeatedly, on a time scale of a few seconds. In some embodiments, an application's code is broken up into a modular hierarchy of templates and sub-templates, wherein each such template defines a specific behavior or manner of processing and/or displaying content data.

In some embodiments, the dynamically fetched code fragments are expressed in bytecode. One advantage of bytecode is portability—code has more or less the same form independently of the device that executes it. This allows for a relatively quick and easy development and deployment of application updates (the same update may be delivered identically to all clients). A disadvantage is that bytecode requires a local interpreter or just-in-time (JIT) compiler to translate it into processor instructions native to each platform. Such interpreters and/or JIT compilers increase the complexity and power consumption of the wearable device.

Dynamic code fetching has several significant advantages when compared with conventional applications. One advantage is that it substantially reduces hardware requirements such as storage and memory, with immediate impact on the power consumption of the respective wearable device. Other advantages are in substantially reducing development time and the time-to-market of the respective application software, and in facilitating the software update process. In conventional software development, since all code is pre-compiled and delivered as one package, changing just one feature of the respective application may require a re-compilation of a large chunk of code representing all other features and behaviors, and the deployment of a relatively large software update to the end client. Furthermore, a bug in the updated code section may potentially bring down the entire application, so updates typically require extensive testing before deployment to clients. In contrast, some embodiments of the present invention allow changing a specific feature of an application independently of other features. When code is bundled into relatively small chunks, which are fetched dynamically onto the app client, each such chunk of code may be updated, tested, and deployed independently of the rest of the code.

Dynamic code fetching also enables a whole new category of application behavior, which is substantially more difficult if not impossible to implement in the conventional model of application development. In some embodiments of the present invention, the functionality of an application may change on-the-fly, for instance to temporarily incorporate new features (advertising messages, various notifications) directly into the flow of the current application. Such new features may even be correlated across distinct applications. In one such example, the user may launch a calendar application and attempt to schedule a business dinner for the next evening. The utility server may determine that the respective user also subscribes to a sports application, and has indicated that he supports a particular football team. The utility server may further determine, according to a data stream of the respective sports application, that the user's favorite team is playing an important match during the scheduled dinner. In response to the attempted creation of a calendar event, the utility server may send a fragment of code to the respective app client instructing the device to inform the user of the possible scheduling conflict, and to request a confirmation before confirming the new calendar event.

In some embodiments of the present invention, the utility server dynamically deploying on-demand code also acts as an intermediary between the application client and the application server delivering content data to the respective client. By inserting a shim in between the client and the application server, some embodiments manage to dynamically change a pre-determined behavior of a mobile application, for instance to insert advertising messages, notifications, and/or other content into the "normal" execution of the respective application.

In some embodiments, the smartphone is used as a template deployment assistant. The smartphone may pre-fetch a set of templates from the utility server, and may store the respective templates locally, in a template repository on computer readable media of the smartphone. Then the respective templates may be rapidly deployed on demand to end client devices such as a smartwatch. Such configurations may significantly accelerate template deployment to app clients. In some embodiments, the smartphone may further act as a data broker for a plurality of client devices (e.g., several smartwatches, a tablet computer, a smart thermostat, etc.). Each client device may register for service with the smartphone. The smartphone may then receive content data destined for any of the registered client devices, and further distribute it, selectively, to each client.

It will be clear to one skilled in the art that the above embodiments may be altered in many ways without departing from the scope of the invention. Accordingly, the scope of the invention should be determined by the following claims and their legal equivalents.

What is claimed is:

1. A mobile telephone comprising at least one hardware processor and a memory, the at least one hardware processor configured to:
   in response to receiving from a wearable computing device a client state indicator comprising an indicator of a current state of a mobile application executing on the wearable computing device, transmit the client state indicator to a remote utility server;
   receive from the utility server a client-side code fragment comprising program instructions instructing the wearable computing device to perform a behavior including displaying a set of content data on an output device of the wearable computing device; and
   in response to receiving the client-side code fragment, transmit the client-side code fragment to the wearable computing device, wherein:
   the set of content data is obtained, by the mobile telephone, from a remote application server; and the client-side code fragment is determined by the utility server in communication with the mobile telephone, wherein determining the client-side code fragment includes the utility server formulating a request for the set of content data to the application server, the request formulated according to the client state indicator.

2. The mobile telephone of claim 1, wherein the at least one hardware processor is further configured to:
in response to transmitting the client state indicator to the utility server, receive from the utility server a phone-side code fragment comprising program instructions instructing the mobile telephone to perform a phone-side behavior; and
execute the phone-side code fragment to perform the phone-side behavior.

3. The mobile telephone of claim 2, wherein the phone-side behavior comprises an item selected from a group consisting of requesting input from a user of the mobile telephone, playing a sound, connecting to a remote computer system, and displaying a set of phone-side content data received from the utility server.

4. The mobile telephone of claim 3, wherein the phone-side content data comprises an encoding of an advertising message.

5. The mobile telephone of claim 2, wherein the phone-side code fragment comprises code to be executed by the at least one hardware processor in response to receiving a user input via an input device of the mobile telephone.

6. The mobile telephone of claim 1, wherein determining the client-side code fragment comprises the utility server selectively retrieving the client-side code fragment from a code repository according to the client state indicator.

7. The mobile telephone of claim 1, wherein the at least one hardware processor is further configured, in response to receiving the client state indicator, to transmit a phone state indicator to the utility server, the phone state indicator indicative of a current state of the mobile telephone, wherein the phone state indicator comprises an item selected from a group consisting of an indicator of a current physical location of the mobile telephone, an indicator of a state of a software application currently in execution on the mobile telephone, and an indicator of a current motion of the mobile telephone.

8. The mobile telephone of claim 1, wherein the at least one hardware processor is further configured to:
in response to receiving the client state indicator, search for a copy of the client-side code fragment in a local code repository residing on a storage device of the mobile telephone; and
in response to searching for the copy, when the copy is found within the local code repository, transmit the copy to the wearable computing device.

9. The mobile telephone of claim 1, wherein the at least one hardware processor is further configured to:
in response to receiving the client state indicator, select a second client-side code fragment from a local code repository residing on a storage device of the mobile telephone, the second client-side code fragment instructing the wearable computing device to perform a second behavior, the second client-side code fragment selected according to the client state indicator; and
transmit the second client-side code fragment to the wearable computing device.

10. The mobile telephone of claim 1, further configured to selectively deliver client-side code fragments to a plurality of client devices including the wearable computing device, and wherein the at least one hardware processor is further configured, in preparation for transmitting the client-side code fragment to the wearable computing device, to identify the wearable computing device as a recipient of the client-side code fragment according to the client state indicator.

11. A computer system comprising at least one hardware processor configured to:
receive a client state indicator from a mobile telephone communicatively coupled to a wearable computing device, the client state indicator sent by the mobile telephone in response to receiving the client state indicator from the wearable computing device;
in response to receiving the client state indicator, transmit a request for a set of content data to a remote application server, the request formulated according to the client state indicator;
receive the content data from the application server;
in response to receiving the content data, formulate a client-side code fragment comprising program instructions instructing the wearable computing device to perform a behavior, including displaying a set of content data on an output device of the wearable computing device, the client-side code fragment formulated according to the client state indicator and further according to the content data; and
transmit the client-side code fragment to the mobile telephone for distribution to the wearable computing device, wherein:
the wearable computing device is configured to send the client state indicator during execution of a mobile application in response to detecting an event triggering the mobile application to perform the behavior.

12. The computer system of claim 11, wherein formulating the client-side code fragment comprises selectively retrieving the code fragment from a code repository according to the client state indicator.

13. The computer system of claim 11, further configured to send content data requests to a plurality of server computer systems including the application server, and wherein the at least one hardware processor is further configured, in preparation for sending the request, to select the application server from the plurality of server computer systems according to the client state indicator.

14. The computer system of claim 11, wherein the at least one hardware processor is further configured, in preparation for sending the request, to:
receive from the mobile telephone a phone state indicator indicative of a current state of the mobile telephone, wherein the phone state indicator comprises an item selected from a group consisting of an indicator of a current physical location of the mobile telephone, an indicator of a state of a software application currently in execution on the mobile telephone, and an indicator of a current motion of the mobile telephone; and
formulate the request for the content data further according to the phone state indicator.

15. The computer system of claim 11, wherein the at least one hardware processor is further configured, in response to receiving the content data, to:
formulate a phone-side code fragment comprising program instructions instructing the mobile telephone to perform a phone-side behavior; and
transmit the phone-side code fragment to the mobile telephone.

16. The computer system of claim 15, wherein the phone-side behavior comprises an item selected from a group consisting of requesting input from a user of the mobile telephone, playing a sound, send a data item to the computer system, and displaying a set of phone-side content data received from the computer system.

17. The computer system of claim 16, wherein the phone-side content data comprises an encoding of an advertising message.

18. The computer system of claim 15, wherein the phone-side code fragment comprises code to be executed by the at least one hardware processor in response to receiving a user input via an input device of the mobile telephone.

19. A wearable computing device configured to be communicatively coupled with a mobile telephone, the wearable computing device comprising:
　at least one hardware processor and, the at least one hardware processor configured to:
　　execute a mobile application, and
　　detect a trigger event occurring during execution of the mobile application;
　　in response to detecting the trigger event, dynamically fetch a client-side code fragment by transmitting a client state indicator to the mobile telephone, the client state indicator comprising an indicator of a current state of the mobile application;
　　receive from the mobile telephone the client-side code fragment including program instructions instructing the wearable computing device to perform a behavior related to the trigger event, including displaying a set of content data on an output device of the wearable computing device; and
　　in response to receiving the client-side code fragment, execute the client-side code fragment to perform the behavior; wherein:
　　　the set of content data is obtained, by the mobile telephone, from a remote application server; and
　　　the client-side code fragment is determined by a remote utility server in communication with the mobile telephone, wherein determining the client-side code fragment includes the utility server formulating a request for the set of content data to the application server, the request formulated according to the client state indicator.

20. The wearable computing device of claim 19, wherein the client-side code fragment comprises a set of bytecode instructions, and wherein executing the client-side code fragment comprises:
　translating the bytecode instructions into native processor instructions of the at least one hardware processor; and
　in response, employing the at least one hardware processor to execute the native processor instructions.

21. The wearable computing device of claim 19, wherein the event comprises an item selected from a group consisting of receiving a user input via an input device of the wearable computing device, and a motion of the wearable computing device.

22. The wearable computing device of claim 19, wherein the client-side code fragment comprises code to be executed by the at least one hardware processor in response to receiving a user input via an input device of the wearable computing device.

23. The wearable computing device of claim 19, wherein the client-side code fragment comprises code to be executed by the at least one hardware processor in response to a motion of the wearable computing device.

24. The wearable computing device of claim 19, wherein the content data comprises an encoding of an advertising message.

25. A non-transitory computer-readable medium storing processor instructions which, when executed by at least one hardware processor of a mobile telephone, cause the mobile telephone to:
　in response to receiving from a wearable computing device a client state indicator comprising an indicator of a current state of a mobile application executing on the wearable computing device, transmit the client state indicator to a remote utility server;
　receive from the utility server a client-side code fragment comprising program instructions instructing the wearable computing device to perform a behavior including displaying a set of content data on an output device of the wearable computing device; and
　in response to receiving the client-side code fragment, transmit the client-side code fragment to the wearable computing device, wherein
　　the set of content data is obtained, by the mobile telephone, from a remote application server; and
　　the client-side code fragment is determined by the utility server in communication with the mobile telephone, wherein determining the client-side code fragment includes the utility server formulating a request for the set of content data to the application server, the request formulated according to the client state indicator.

26. A non-transitory computer-readable medium storing processor instructions which, when executed by at least one hardware processor of a wearable computing device, cause the wearable computing device to:
　detect a trigger event occurring during execution of a mobile application;
　in response to detecting the trigger event, dynamically fetch a client-side code fragment by transmitting a client state indicator to the mobile telephone, the client state indicator comprising an indicator of a current state of the mobile application;
　receive from the mobile telephone the client-side code fragment including program instructions instructing the wearable computing device to perform a behavior related to the trigger event, including displaying a set of content data on an output device of the wearable computing device; and
　in response to receiving the client-side code fragment, execute the client-side code fragment to perform the behavior; wherein:
　　the set of content data is obtained, by the mobile telephone, from a remote application server; and
　　the client-side code fragment is determined by a remote utility server in communication with the mobile telephone, wherein determining the client-side code fragment includes the utility server formulating a request for the set of content data to the application server, the request formulated according to the client state indicator.

* * * * *